March 7, 1944.   H. F. MAYNES   2,343,313
AQUATIC AMUSEMENT APPARATUS
Filed Aug. 4, 1939   11 Sheets-Sheet 1

INVENTOR
Hyla F. Maynes
BY
Beau, Brooks, Buckley & Beau.
ATTORNEYS

March 7, 1944. H. F. MAYNES 2,343,313
AQUATIC AMUSEMENT APPARATUS
Filed Aug. 4, 1939 11 Sheets-Sheet 2

INVENTOR
Hyla F. Maynes
BY
Bean, Brooks, Buckley & Bean.
ATTORNEYS

March 7, 1944.    H. F. MAYNES    2,343,313
AQUATIC AMUSEMENT APPARATUS
Filed Aug. 4, 1939    11 Sheets-Sheet 3

INVENTOR
Hyla F. Maynes
BY
Beau, Brooks, Buckley & Beau.
ATTORNEYS

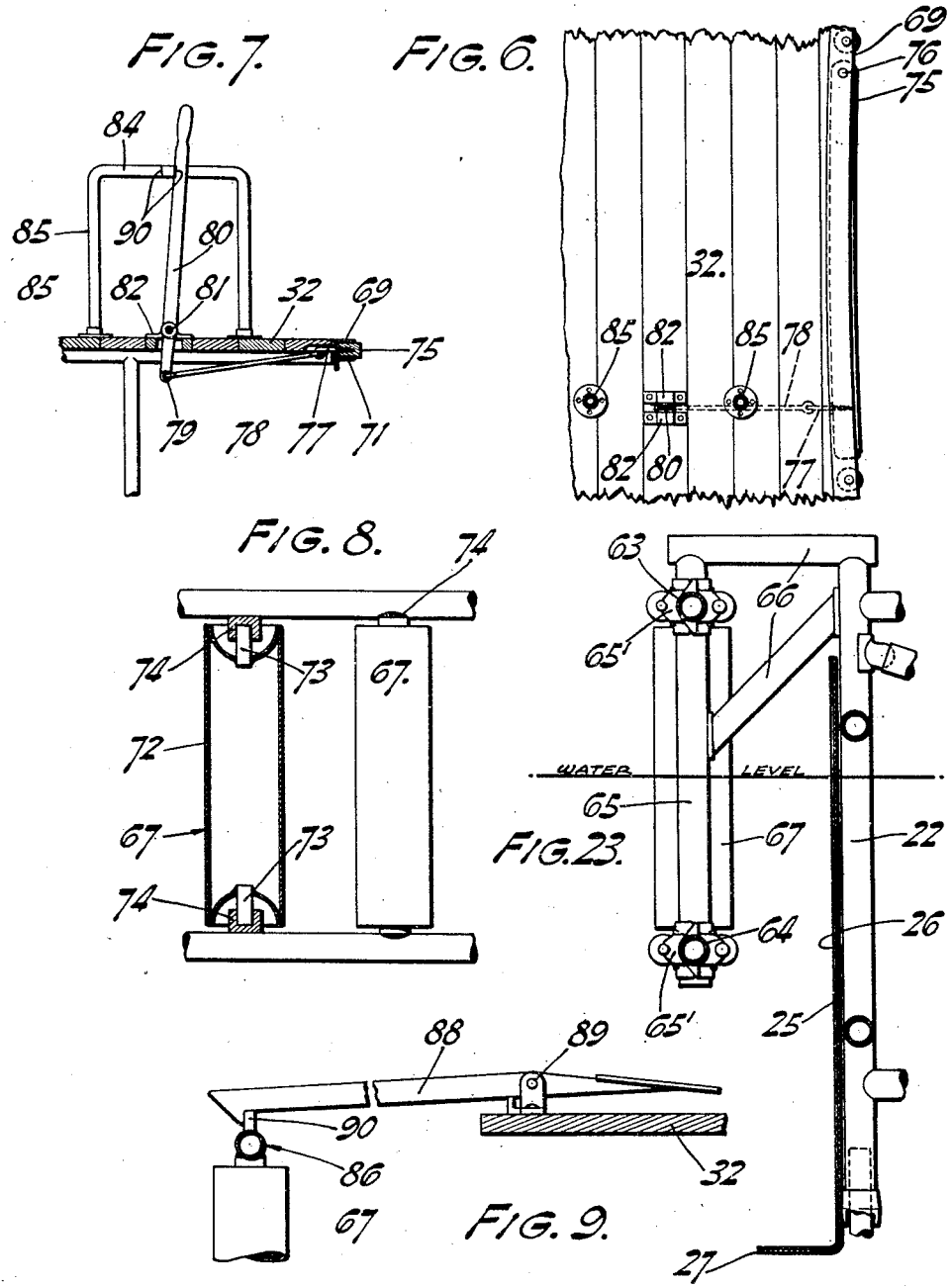

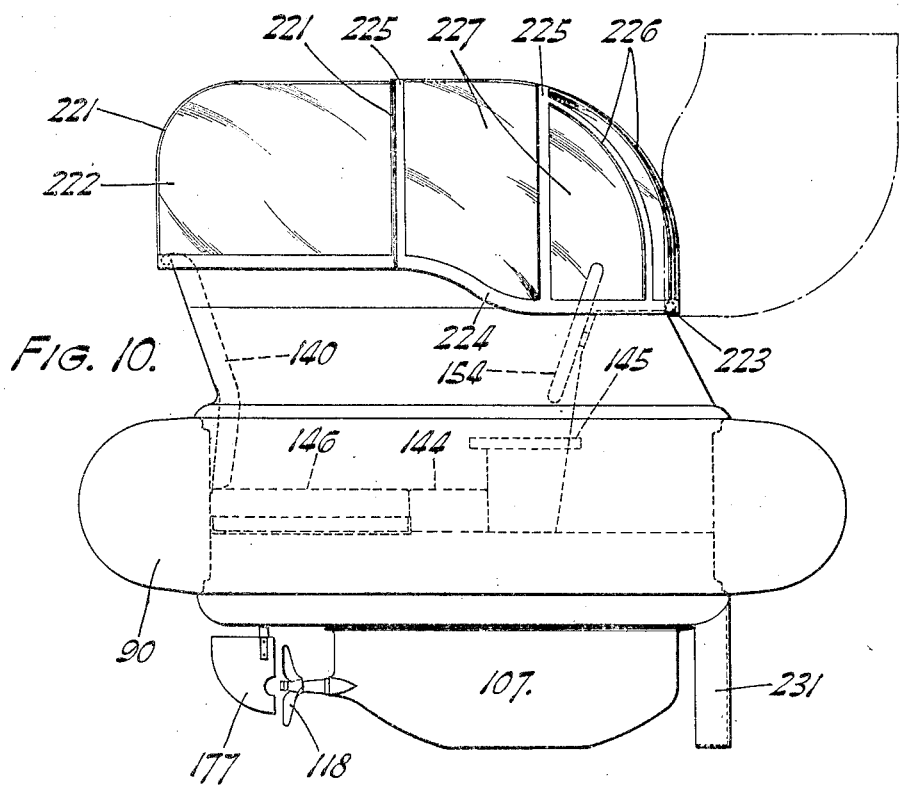
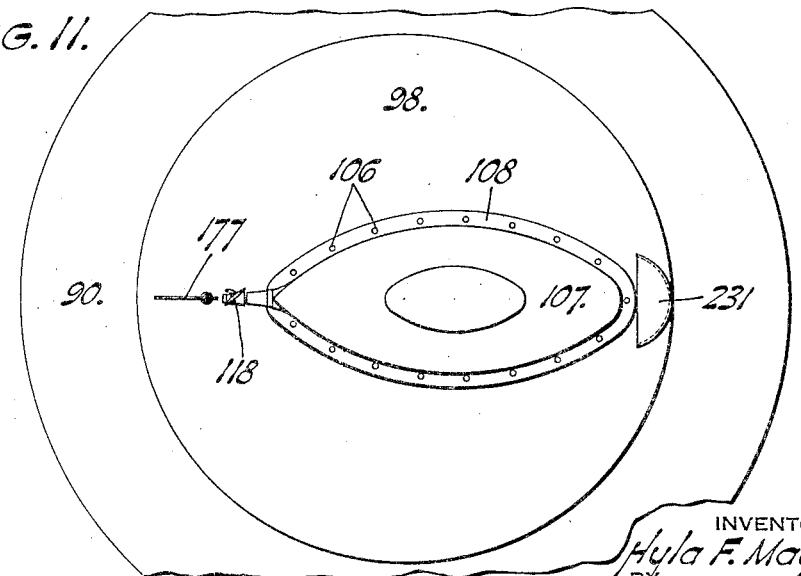

March 7, 1944.　　　H. F. MAYNES　　　2,343,313
AQUATIC AMUSEMENT APPARATUS
Filed Aug. 4, 1939　　　11 Sheets-Sheet 6

INVENTOR
Hyla F. Maynes
BY
Beau, Brooks, Buckley & Beau.
ATTORNEYS

March 7, 1944. H. F. MAYNES 2,343,313
AQUATIC AMUSEMENT APPARATUS
Filed Aug. 4, 1939 11 Sheets-Sheet 7
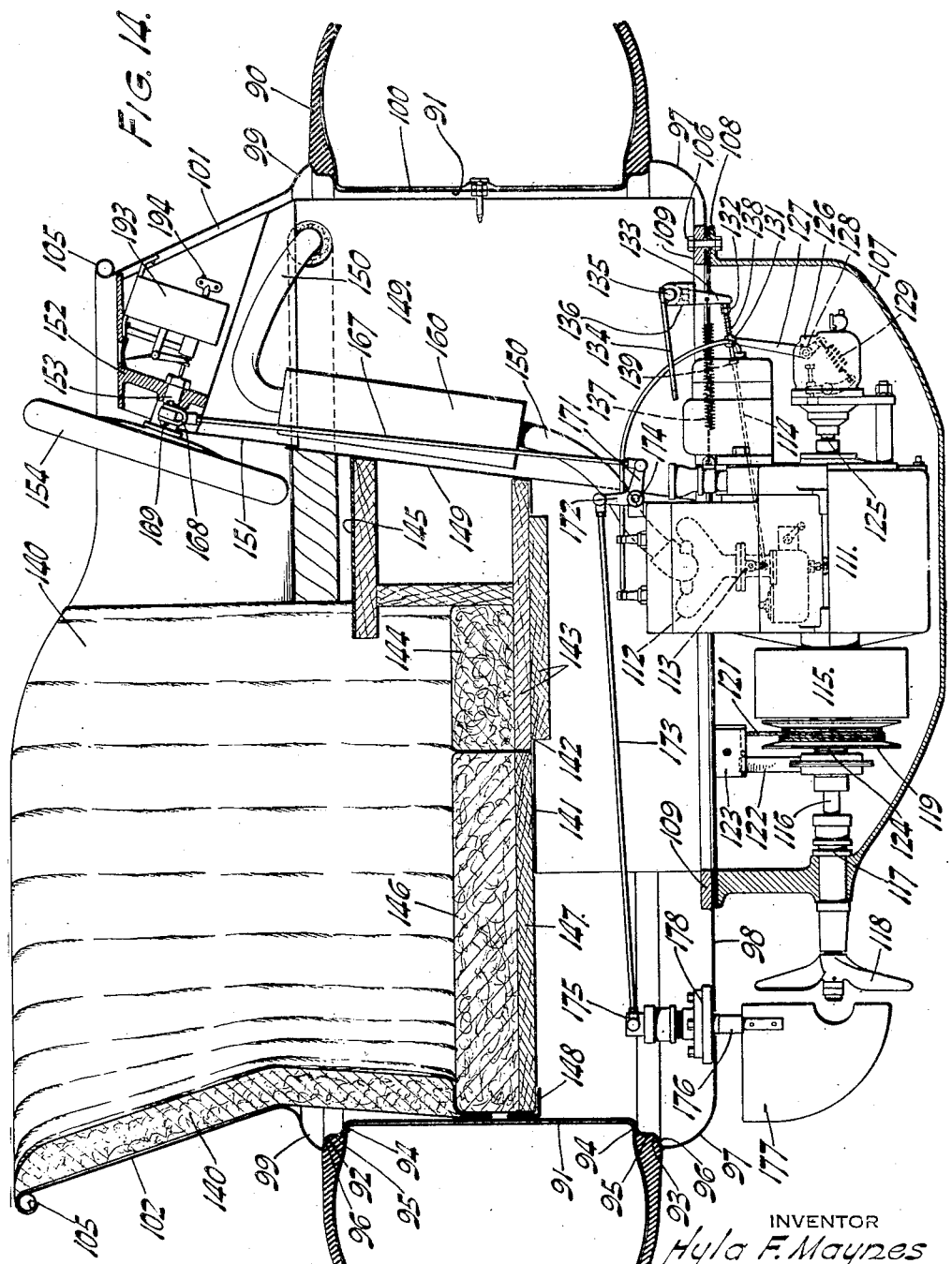
INVENTOR
Hyla F. Maynes
BY
Beau, Brooks, Buckley & Beau
ATTORNEYS March 7, 1944. H. F. MAYNES 2,343,313
AQUATIC AMUSEMENT APPARATUS
Filed Aug. 4, 1939 11 Sheets-Sheet 8
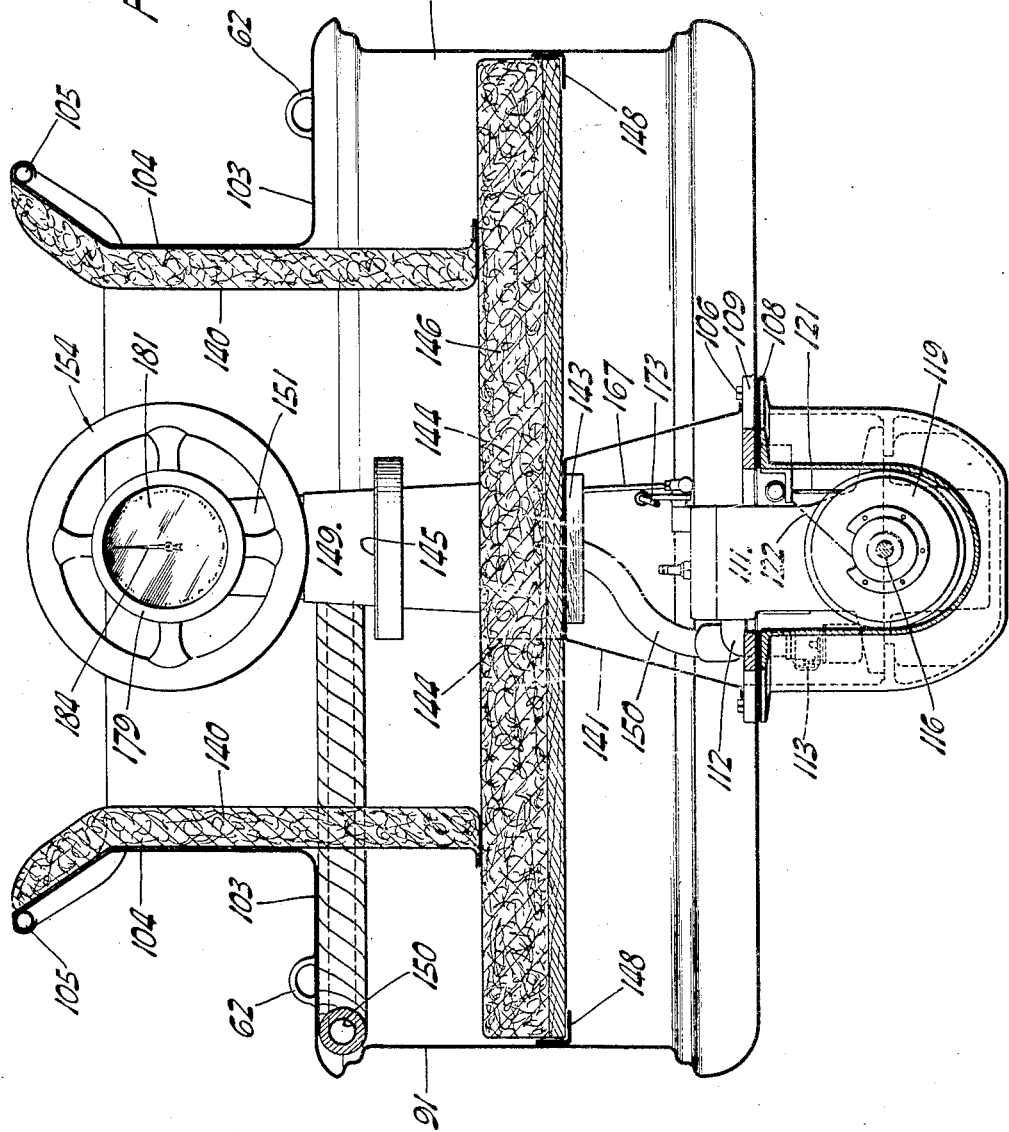
INVENTOR
Hyla F. Maynes
BY
Bean, Brooks, Buckley & Bean
ATTORNEYS March 7, 1944.  H. F. MAYNES  2,343,313
AQUATIC AMUSEMENT APPARATUS
Filed Aug. 4, 1939   11 Sheets-Sheet 9
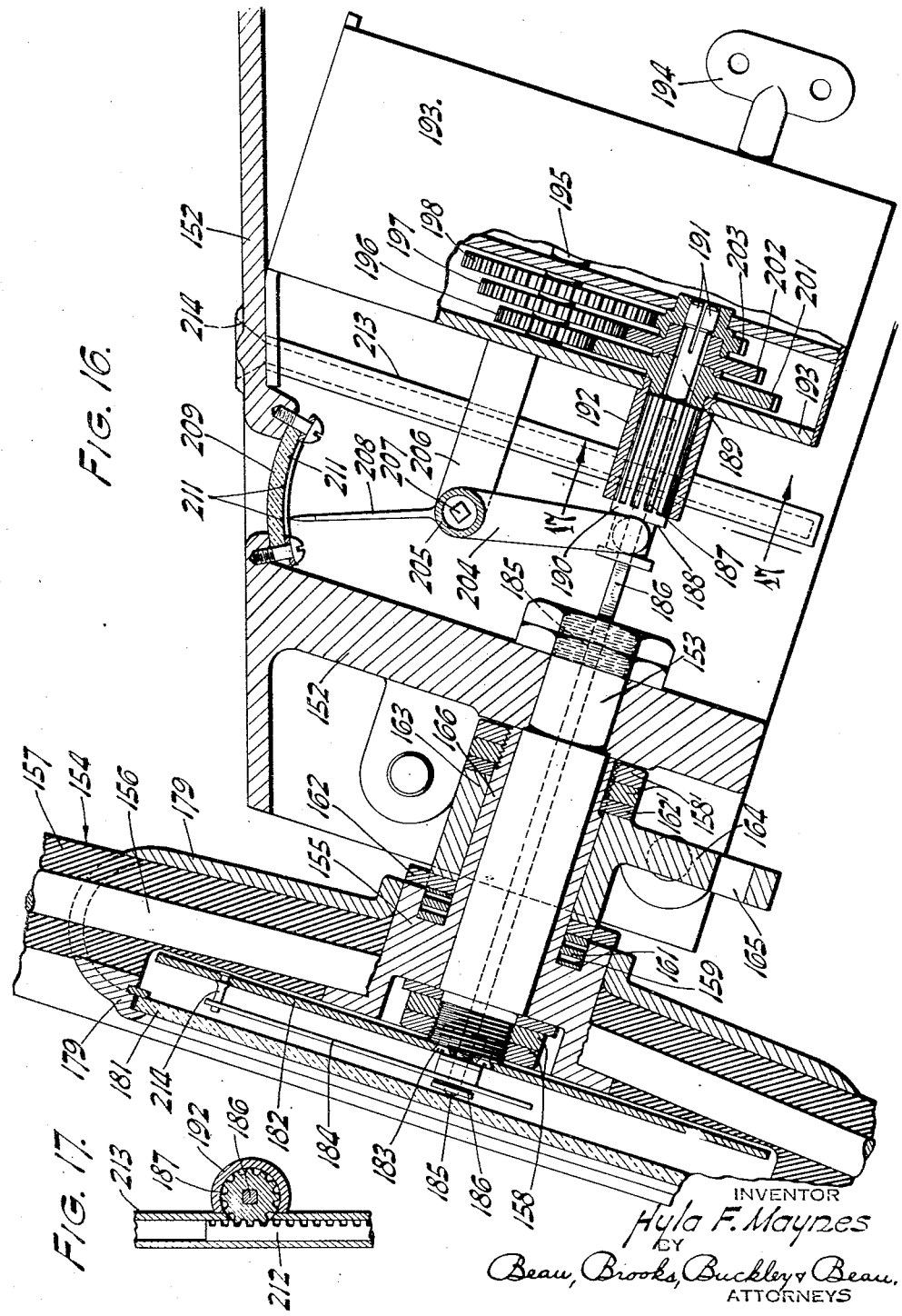

March 7, 1944. H. F. MAYNES 2,343,313
AQUATIC AMUSEMENT APPARATUS
Filed Aug. 4, 1939 11 Sheets-Sheet 10
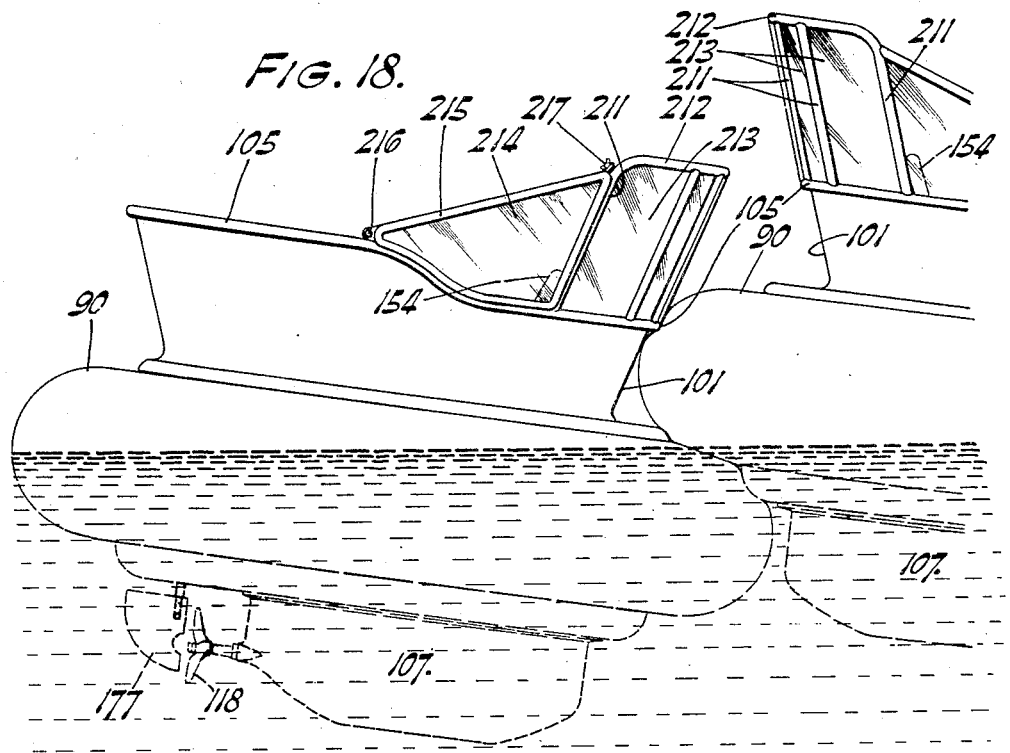
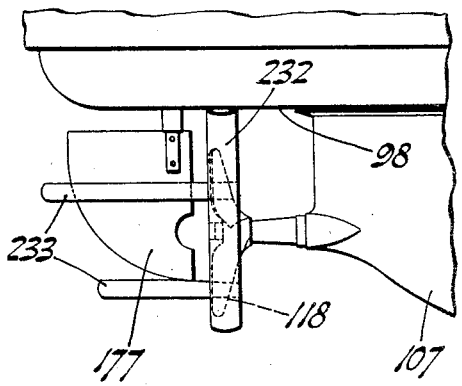
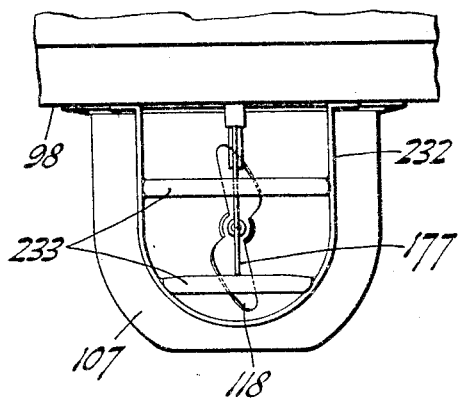
INVENTOR
Hyla F. Maynes
BY
Bean, Brooks, Buckley & Bean
ATTORNEYS

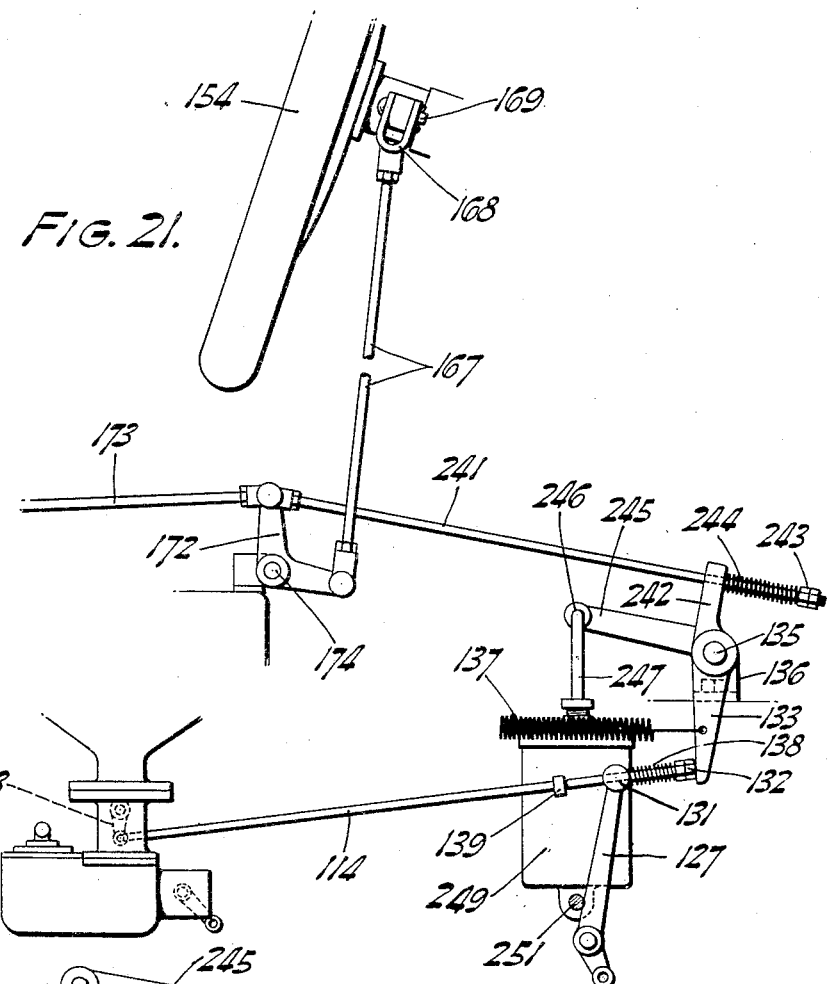
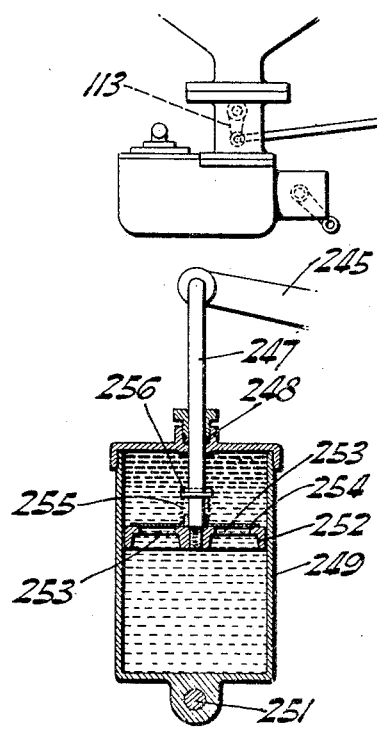

Patented Mar. 7, 1944

2,343,313

UNITED STATES PATENT OFFICE 2,343,313

AQUATIC AMUSEMENT APPARATUS

Hyla F. Maynes, North Tonawanda, N. Y., assignor of one-half to Emma C Maynes, North Tonawanda, N. Y.

Application August 4, 1939, Serial No. 288,407

6 Claims. (Cl. 9—1)

The present invention relates to aquatic amusement apparatus and has particular relation to apparatus wherein one or more patron-controlled motor boats are employed.

According to the present invention an enclosed body of water is provided with boats of novel construction rendering them stable and safe, and adapted to safely collide head-on or otherwise with one another or with stationary objects, even when the boats are travelling at full speed, without danger of upset or injury to the boats or to the patron-passengers therein.

Each boat may be driven by an engine operated screw propeller and may be provided with a rudder, and both the engine and rudder may be controlled by a patron-passenger in the boat.

The water in which the boats operate may be contained in a canvas tank supported by a knockdown framework. Around such tank vertical rollers may be provided to enable the boats to readily turn when in contact with the tank walls.

At one side of the tank there may be a slip through which the boats may pass beside a loading platform from which patrons may enter or leave the boats. Suitable entering and exiting means may be provided to and from the platform.

Each boat may be provided with meter means for recording the time each boat has been employed, such meter means being disposed within the view of the occupants and preferably having an indicator dial on the steering wheel which is calibrated either in terms of time or money.

Means are also provided for storing boats out of water at one side of the tank, and for lifting them to and from the water for storage.

These and other objects and advantages will become apparent from the following description of the apparatus shown in the accompanying drawings, wherein:

Fig. 6 is a fragmentary plan sectional view showing a brake associated with the loading platform;

Fig. 7 is a fragmentary vertical sectional view showing the brake;

Fig. 8 is a detail elevational view of the roller structure associated with a gate in the slip adjacent the loading platform and extending around the tank;

Fig. 9 is a sectional view taken along line 9—9 of Fig. 1, showing a latch for the gate;

Fig. 10 is a side elevational view of the boat;

Fig. 11 is a bottom plan view of the boat;

Fig. 14 is a longitudinal vertical section through the boat;

Fig. 15 is a transverse vertical section through the boat;

Fig. 16 is a sectional view, on a larger scale, of the meter mechanism associated with the steering wheel of the boat;

Fig. 17 is a fragmentary sectional view taken along line 17—17 of Fig. 16;

Fig. 18 is a side elevational view showing the boats of modified construction in head-on collision;

Figs. 19 and 20 are fragmentary side and rear elevations, respectively, of protective means for the propeller and rudder of the boat;

Fig. 21 is a diagrammatic view illustrating a novel throttle control mechanism;

Fig. 22 is a sectional view of a dash-pot employed in the throttle control mechanism of Fig. 21; and, Fig. 23 is a vertical sectional view showing the roller supporting means on the tank wall.

Figure 1:
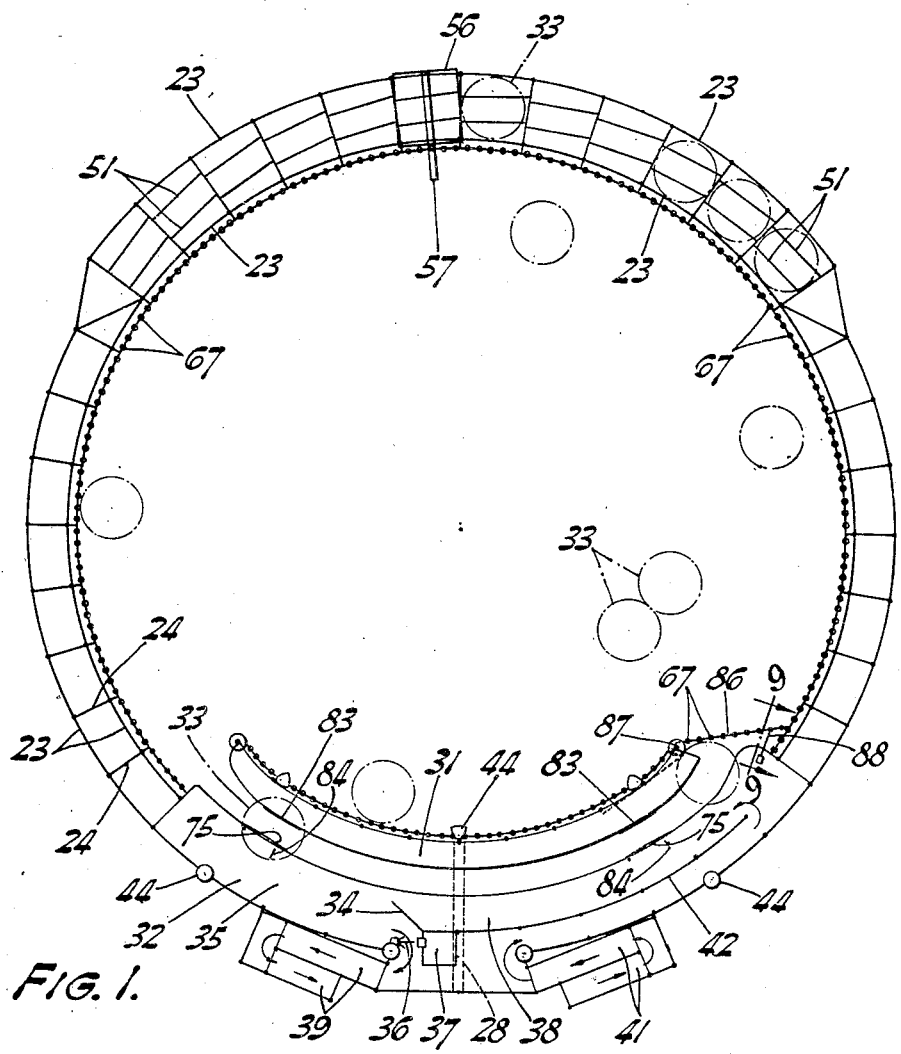
Fig. 1 is a plan view of the tank and adjacent structure, with the boats therein indicated by broken lines.
Figure 2:
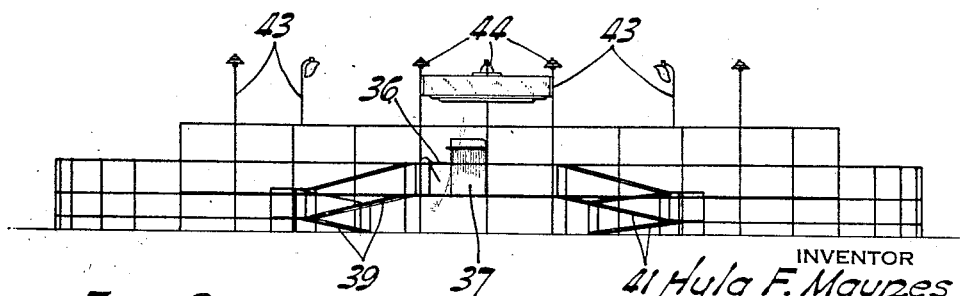
Fig. 2 is a front elevation of the structure shown in Fig. 1.

As shown in the drawings, the structure may consist of a tank 21 of canvas or similar material, supported upon a framework of generally annular form consisting of uprights 22 and horizontal members 23 and 24. The side wall portions 25 of the canvas tank may be secured to and supported by a sheet metal ring having an upright wall portion 26 and a horizontal wall portion 27, the latter bearing upon the earth or upon a plate 28 which connects certain of uprights 22, and the wall portion 26 being backed at spaced intervals by certain of the adjacent uprights 22.

Above the water level 29 of the tank, at one side thereof, are spaced inner and outer loading platforms 31 and 32 consisting of planks supported upon horizontal members 24 of the framework. The space between the platform constitutes a slip through which boats 33 may pass for loading and unloading. Platform 32 may be divided by fence 34 into an unloading section 35 and a loading section 38. Persons wishing to ride in the boats may pass up entrance ramps 41 and along fence 42 to the part of loading section 38 adjacent the slip, while persons who have ridden in the boats may step therefrom onto unloading section 35 and may pass therefrom through gate 36 and past a cashier's booth 37 into exit ramps 39.

Certain of the upright members 22 of the framework may be extended, as indicated at 43, to support lamps 44 which serve to illuminate the structure and particularly the loading and unloading platforms. If desired, canvas or other material may be supported upon the outer uprights 22 and horizontal members 23 of the framework to completely or partially screen the tank from persons outside of the structure.

Extending around the tank inwardly of the upright walls 25 are horizontal supports 64, supports 63 being above the water level and supports 64 being below the water level. As shown in Fig. 23 the horizontal supports may be detachably secured to upright tubular members 65 by clamps 65', which are preferably of the kind disclosed in my Patent No. 2,236,826 dated April 1, 1941. The uprights 65 are supported by brackets 66 which extend above the vertical wall portion 25 of the tank, obviating perforation of the latter, the brackets being connected to vertical members 22 of the supporting framework.

At frequently spaced intervals along the supports 63 and 64 are vertical rollers 67. These rollers are mounted for rotation, about their vertical axes, on the supports and are engageable by the boats when the latter approach the sides of the tank. As shown in Fig. 8 the rollers may consist of tubes 72 with closed ends provided with pins 73 bearing in cups 74 welded to the horizontal supports. Upon detachment of clamps 65' the horizontal supports 63 and 64 may be separated, permitting easy removal of the rollers from cups 74.

Figure 5:
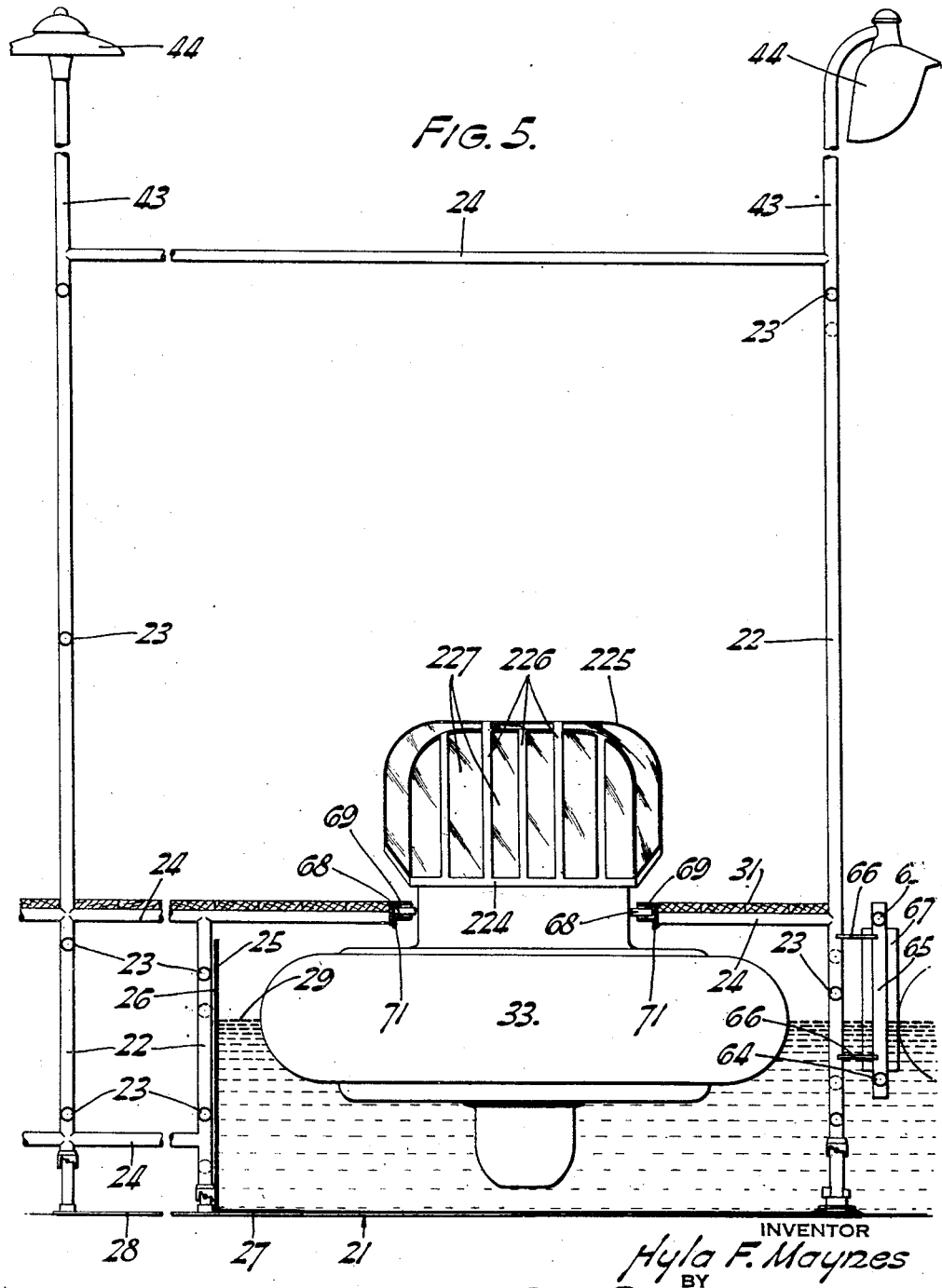
Fig. 5 is a vertical sectional view taken through the loading platform portion of the structure shown in Fig. 1, one of the boats appearing in the view in front elevation.

Along the edges of the platforms 31 and 32 facing the slip there are mounted at frequently spaced intervals rollers 68, as shown in Fig. 5, each of which is journaled for rotation about a vertical axis. These rollers may be supported by a channel unit made up of angle irons 69 and 71 which are secured to the edges of the platforms, their function being to permit the boats to have a rolling instead of scraping contact with the edges of the platforms as they pass through the slip.

Mounted on each of the platform sections 35 and 36 at the point where it is desired to stop boats for unloading and loading are braking devices indicated on Fig. 1 and shown in detail in Figs. 6 and 7. Each of these braking devices may consist of a wooden brake shoe 75 pivoted at 76 to the roller supporting angle irons 69 and 71.

A member 77 secured to the free end of shoe 75 is pivoted to a horizontal link 78 which extends under the platform 32 and is pivoted at 79 to a lever 80. The latter has a pivot pin 81, constituting its fulcrum, secured to the platform by brackets 82. The upper end of the lever serves as a handle by means of which the shoe 75 may be swung outwardly, horizontally, to cause it to engage the side of a boat and hold the boat against movement, a stationary brake shoe 83 (Fig. 1) preferably being disposed on the opposite wall of the slip to engage the opposite side of the boat.

A cross-bar 84 supported by uprights 85 adjacent the brake lever has shoulders 90 which prevent accidental movement of lever 80, but by flexing the latter away from the cross-bar it may be shifted. In the position shown in Figs. 6 and 7, the brake is inoperative, but when the upper end of the lever 80 is moved to the left, as the parts appear in these views, the brake shoe 75 will be moved (to the right) into operative position.

At the end of the slip adjacent the loading end of the platform is a gate 86, provided with vertical rollers 67, and hinged at 87. The gate is normally urged to closed position by a resilient member, but may be swung open by a boat leaving the slip. To control the departure of boats from the slip, the gate may be closed by a latch, indicated in Fig. 1 and shown in detail in Fig. 9. This latch consists of a bar 88 pivoted at 89 to a bracket supported on platform 32. One end of the bar is a hook engaging a stop 90 on the gate 86 to prevent it from swinging open, while the other end of the bar is a pedal by which the latch may be released.

Figure 3:
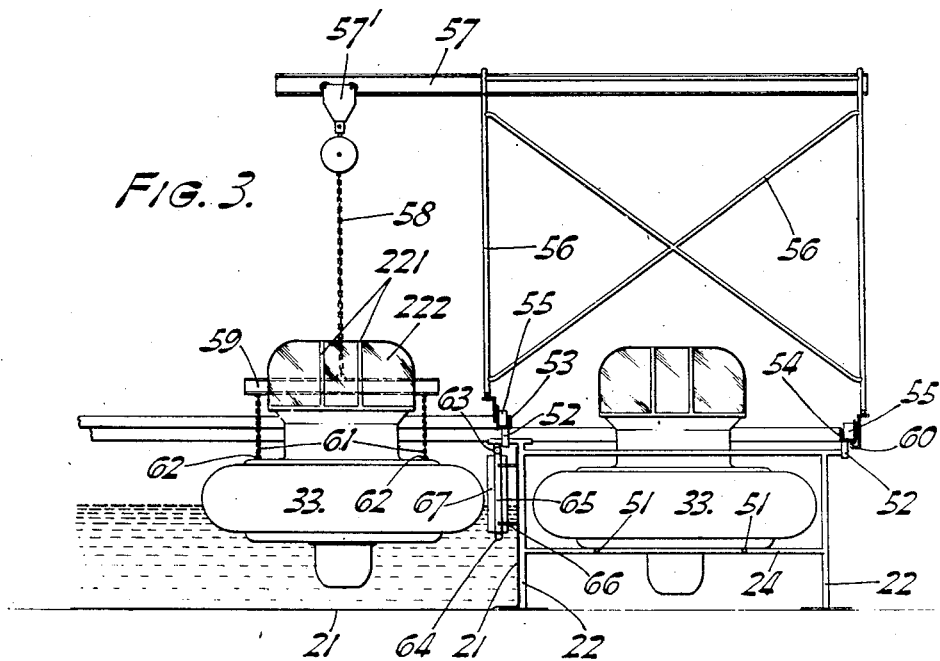
Fig. 3 is a vertical sectional view taken through the structure at the storage side thereof.
Figure 4:
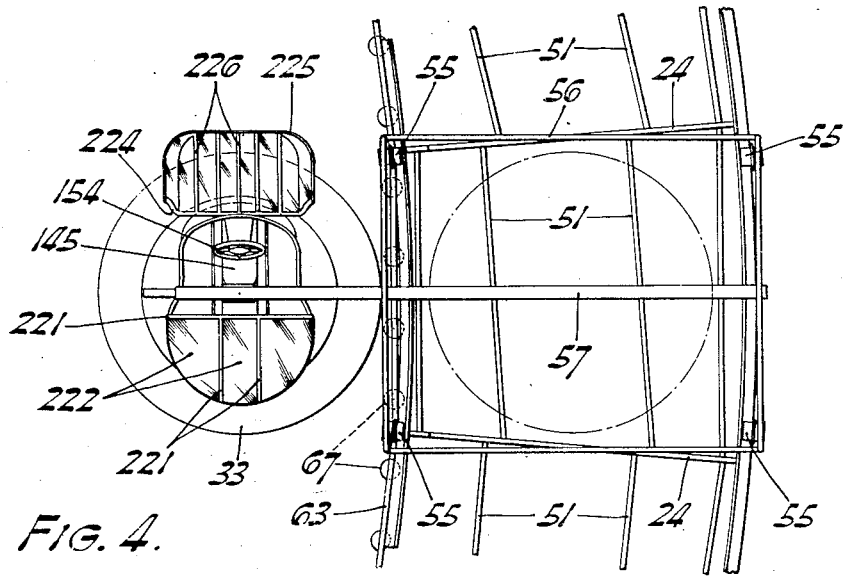
Fig. 4 is a plan view of the portion of the structure shown in Fig. 3.

At the side of the tank opposite from the platforms the framework has a plurality of boat storing panels, the inner and outer horizontal members 23 of the framework being spaced widely enough in these panels (twelve of which are shown on the drawings) to receive a boat therebetween, and, as shown in Figs. 3 and 4, boat supporting members 51 are extended between certain of the horizontal members 24 in these panels. Mounted on supports 52 above the portion of the framework housing members 51, are inner and outer tracks 53 and 54 for wheels 55 of a crane 56 having a boom 57. The latter projects over the tank 21 and arranged for movement along it is a carriage 57' having suitable hoisting tackle including chain 58 and a cross bar 59 from which depends chains 61 adapted to be hooked to bails 62 on opposite sides of the boats.

With this apparatus a boat may be lifted from the tank 21 and be deposited on supporting members 51, the crane 56 being movable along track rails 53 and 54 to any panel of boat storing section of the structure, or may be lifted from the supported members and placed in the tank. A guard member 60 extends from the crane under outer rail 54 to prevent the crane from being upset when lifting a boat from the tank.

The structure of the boats will now be described. Each boat has a heavy sheet metal hull comprising a cylindrical side wall portion 91 with upper and lower annular flanges 92 and 93, each of which consists of an outwardly extended portion 94, thence a vertically extended portion 95, and thence another outwardly directed portion 96, the general arrangement of the side wall and flanges constituting a drop-center rim similar in arrangement to the drop-center rim employed on automobile wheels. Extending around the rim and retained by the flanges 92 and 93 is a pneumatic tire including a flexible casing 90 whose inner peripheries rest upon flange portions 94, and an inner tube 100 that may have the usual valve stem by which it may be inflated with air to the desired pressure.

The outer periphery of the lower annular flange 93 merges in a downwardly rounded portion 97 into a substantially flat hull bottom 98 which constitutes the floor of the boat. The outer periphery of the upper annular flange merges in an upwardly rounded portion 99 which at the front of the boat merges into an upwardly extending, rearwardly inclined front wall 101; at the rear of the boat merges into an upwardly and rearwardly inclined back wall 102; and at the sides of the boat merges into substantially horizontal upper walls 103, the latter in turn merging into upwardly extending upper side walls 104. The upper edges of wall portions 101, 102 and 104 may be provided with a bead 105 which extends completely around the opening in the top of the boat.

Secured to the hull bottom 98 by means of bolts 106 is an engine housing 107. The latter has a flange 108 through which the bolts pass, also passing through a clamping member 109 disposed upon the hull bottom. Mounted in the housing is an internal combustion engine 111 having an intake 112 controlled by a throttle valve 113 operated by a link 114. Upon the engine drive shaft is a flywheel 115 which preferably has built thereinto a centrifugal clutch, arranged to connect the engine drive shaft to propeller shaft 116 only when the engine operates above idling speed. The propeller shaft extends through a bearing and stuffing box 117 and has on its outer end a screw propeller 118 secured by a pin to the shaft for rotation therewith.

Mounted for rotation on the propeller shaft and having a ratchet connection with flywheel 115 is a starting pulley 119 around which is wrapped several turns of a cable 121. By pulling the latter, an operator may start the engine in the usual manner. A heavy clock spring 122 whose outer end is anchored to a bracket 123 secured to the housing 107, has its inner end coiled about and secured to a tubular extension 124 of the pulley 119, for rewinding the cable onto the pulley when the cable is released after having been pulled out to start the engine.

A forward extension 125 of the engine shaft operates a centrifugal governor 126 which has a lever arm 127 movable counterclockwise (as the parts appear in Fig. 14) about axis 128 as the engine speed increases. A spring 129 attached to the lever urges clockwise movement of it as the engine speed decreases. The throttle control link 114 extends through an eye 131 on the upper end of lever arm 127 and at its end has a stop 132 abutted by an arm 133. The latter is secured to an accelerator pedal 134 and is pivoted at 135 to a stationary bracket 136.

A spring 137 extended between arm 133 and a stationary anchorage urges arm 133 clockwise about its pivot 135, moving the link 114 to its limit position (to the left in Fig. 14). A light compression spring 138 on rod 114 between eye 131 and stop 132 urges the latter forwardly (to the right in Fig. 14) to open the throttle valve 113 of the engine. A stop 139 on rod 114 is engageable by eye 131 of lever 127 to close the throttle when the engine speed is excessive and the governor 126 has swung lever 127 counterclockwise, as the parts appear in Fig. 14.

During operation of the engine, the spring 137 will normally press arm 133 against stop 132, retaining link 114 in its most rearward position, wherein the throttle valve is closed, causing the engine to idle. Depression of the pedal 134 will swing arm 133 forwardly, allowing rod 114 to be moved forwardly by spring 138, opening the throttle and causing the engine to operate at higher speed. In the event the pin securing the propeller 118 to shaft 116 should shear off, or for some other reason, should the engine race, the governor 126 will swing its lever 127 rearwardly, causing eye 131 to abut stop 139 and shift link 114 rearwardly, closing the throttle valve and thereby reducing the engine speed, regardless of the position of pedal 134.

Figure 12:
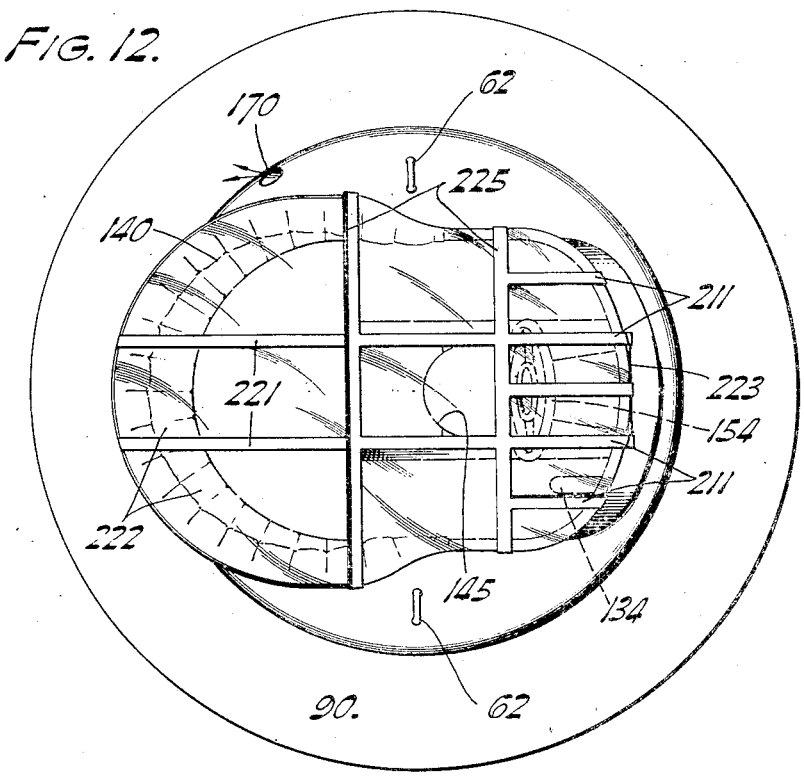
Fig. 12 is a top plan view of the boat.

Extending over the engine housing 107, and above the hull bottom 98, is a sheet metal cover 141, having therein an opening 142 through which access may be had to the engine compartment for starting the engine or for making repairs or adjustments. A removable closure 143 for the opening 142 supports a seat cushion 144 and a step 145 to be used by patrons entering and leaving the boat. As shown in Figs. 12 and 15 the step and cover 141 are relatively narrow and hence, may be straddled by a patron seated on cushion 144, which also is relatively narrow. A larger cushion 146 extending substantially the entire width of the boat may be supported by member 147 which rests upon angle iron 148 extended around the rear portion of side wall 91 of the hull. The back and side portions of the passenger compartment may be covered by upholstery 140.

The forward portion of cover 141 constitutes a standard 149 having an upper section 151 carrying a casting 152. The latter supports a bolt 153 on which is rotatably mounted a steering wheel 154. As shown in Fig. 16, the wheel may have metal spokes 156 and a metal rim, all heavily covered with rubber 157 in order to prevent injury to patrons. The hub 155 of the wheel is held against displacement from the bolt 153 by locking members 158, and in its forward face has an annular recess 159 in which is seated a heavy coiled spring 161. The latter bears upon a friction washer 162 that is disposed between hub 155 and a crank member 163, the latter parts being disposed upon a sleeve projection 166 from the forward face of the hub. A friction washer 162' is disposed between the crank 163 and locking members 158' which retain the spring 161 compressed.

Figure 13:
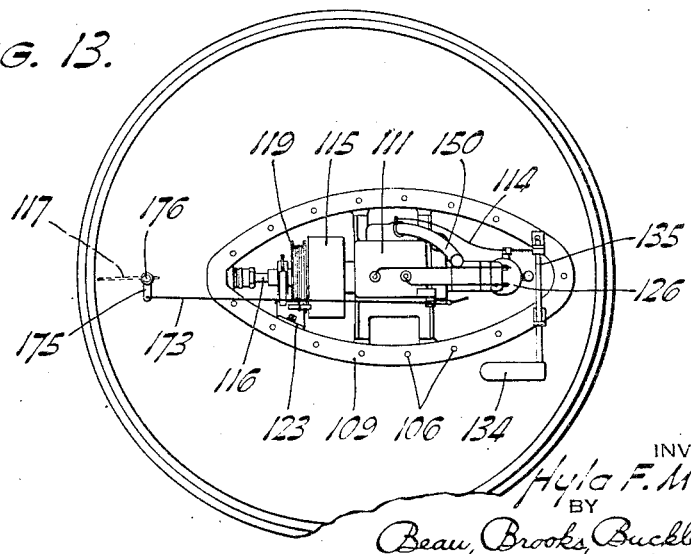
Fig. 13 is a plan sectional view of the boat, the upper portion thereof being broken away.

As shown in Fig. 14 a link 167 has at its upper end a bifurcated fitting 168 pivoted to a pin 169 extending through opening 165 of arm 164, and its lower end pivoted to one arm, 171, of a bell crank whose other arm, 172, is pivoted to a link 173, the bell crank being pivoted at 174 to a bracket which may be secured to engine 111. The rear end of link 173 is, as shown by Figs. 13 and 14, pivoted to an arm 175 secured to a rudder shaft 176. The latter carries rudder 177, which is disposed rearwardly of the screw propeller 118, and extends through a bearing and packing unit 178 secured to the hull bottom 98.

In operation of the steering mechanism, a right turn of the wheel 154 (clockwise as viewed in Fig. 15) will swing crank arm 164 downwardly from its normal horizontal position, lowering link 167 and causing link 173 to move forwardly, thereby swinging rudder 177 to the right (counterclockwise in Fig. 13) and causing the moving boat to turn to the right. An opposite turn of the wheel 154, will, through the same instrumentalities, cause the moving boat to turn left.

Movement of crank 163 by the wheel 154 is dependent upon friction between hub 155, spring 161, washers 162 and 162' and the crank, so that excessive movement of the wheel will merely result in slippage, and jamming, undue straining, or breakage of the parts of the steering gear is thereby avoided. However, since the crank, spring 161, and steering wheel constitute a unit which turns freely on the shaft 153, the friction referred to does not increase the steering effort.

An exhaust pipe 150 from the engine 111 may extend through standard 149 and thence around the upper portion of the hull, being covered with insulation at places adjacent the passenger compartment, and opening to the atmosphere as indicated at 170 in Fig. 12. A muffler 160 in the exhaust line may be disposed within the standard 149.

The meter mechanism shown in detail in Figs. 16 and 17 will now be described. Carried by the steering wheel is a sheet metal casing 179 supporting a glass 181 which protects a meter dial 182 that is secured to bolt 153 by fasteners 183. An indicator hand 184 adapted for movement around the dial is mounted upon a rod 185 by friction means 186, the rod extending through an axial bore in the bolt 153 and having an inner end 186 of non-circular cross section. Slidable upon the latter is a member 190 having elongated gear teeth 187, an annular channel 188, and a rod-like extension 189 with an enlarged and bifurcated head 191.

The gear toothed portion of member 190 is rotatably and slidably received in a tube 192 extended from a casing 193 that is supported within the casting 152 by suitable bracket means. Within the casing is a clockwork mechanism (not shown) which may be wound when necessary by key 194, the clockwork driving at constant speed a shaft 195 carrying gears 196, 197 and 198 of varying pitch diameters.

Co-axial with the rod 185 and members 190 and 192 and each journaled for free rotation in the casing 193 are gears 201, 202 and 203, which constantly mesh respectively with gears 196, 197 and 198. Each of gears 201, 202 and 203 has an axial bore, frictionally engageable by bifurcated head 191 of member 190. Engaged in the annular channel 188 of the latter member is the free end of an arm which is secured to a shaft 205 that is journaled for rotation in a bracket 206.

The shaft 205 has an axial opening therein provided with keyway 207 whereby with the aid of a suitable key (which may be the key 134) shaft 205 and arm 204 may be turned to shift member 190 axially of rod 185 to thereby bring the bifurcated head 191 into frictional engagement with any selected one of gears 201, 202 or 203. Carried by shaft 205 is an indicator needle 208 disposed beneath a window 209 carried by casting 152 and so graduated by indicia 211 as to indicate by the position of the needle 208 which of the gears 201, 202 or 203 is engaged by the bifurcated head 191.

As shown in Fig. 17 there is meshed with gear teeth 187 on member 190 a rack bar 212 which is adapted to slide within a substantially vertical guide tube 213, the latter having a preferably funnel-shaped opening 214 through the upper wall of casting 152.

When a boat occupied by a patron is started out, the operator of the amusement apparatus may set the meter in operation by first winding the clockwise mechanism, if necessary, and then, with a suitable rod (not shown) inserted in tube 213, may depress the rack 212 to its lowermost position, in abutment with the bottom of the tube, thereby rotating the member 190, rod 185 and the indicator hand 184 (counterclockwise as the parts appear in Figs. 15 and 17), which will cause the indicator hand to rotate into abutment with a stop 214 on dial 182.

The clockwork mechanism will commence to rotate the rod 185 and hand 184 (clockwise as viewed in Figs. 15 and 17), so that upon conclusion of the ride the operator of the amusement and the patron will be advised of the extent of the ride. While the dial may be calibrated in time, it is preferred that it be calibrated in terms of money, so that the patron may be constantly advised during the ride of the amount owing, and at the conclusion of the ride the operator is advised, without computation, of the amount the patron should be charged. When another ride is commenced the hand 184 may be set again to starting position by depression of rack 212 as heretofore described. During such setting the head 191 may slip with respect to the gear which it engages so that the clockwork need not be turned backward.

By varying the position of head 191, to engage one or the other of gears 201, 202 or 203, the operator may vary the rental rate, the rate being highest per unit of time when the head 191 is engaged with gear 203 and lowest when engaged with gear 201.

When in operation the boats, after leaving the loading platform, may be driven about the tank along any courses, and at any speeds within the capability of the engine, which the patron-drivers may adopt, these courses and speeds leading to frequent collisions of the several boats. By reason of the shock absorbing characteristics of the tires 99, 100, which are preferably inflated to only a relatively low pressure, the force of impact of even a head-on collision will be insufficient to cause injury to the occupants of the boats.

At times, however, such collisions will cause the boats to partially telescope, as indicated in Fig. 18, the tire 99 of one boat riding upon the tire of the other boat that is involved. In order to prevent the tire of one boat from riding over the edge 105 about the front wall 101 of the other boat, upwardly extending grilles comprised of vertical guard bars 211 and a header bar 212 may be provided on the boats above walls 101 thereof.

Since considerable splashing occurs as a result of collisions of the boats, transparent sheet material 213 is extended between the guard bars. As is also shown in Fig. 18 wings 214 consisting of panes of transparent material supported by framing 215 may be arranged on the sides of the boats rearwardly of the guard bar structure 211, 212.

On at least one side of each boat so equipped the frame 215 is preferably pivoted, as indicated at 216, and is held against pivoting by a releasable fastener 217. By this arrangement the frame 215 may be released and swing about its pivot 216 to enable patrons to enter or leave the boat.

In the boats illustrated in Figs. 3, 4, 5, 10 and 12, the passenger compartments are entirely covered, affording complete protection from splashing to occupants. The covering structure includes a rear section composed of stationary frame members 221 extending over the rear portion of the passenger compartment and supporting transparent cover material 222 which is preferably formed to the spherical contour indicated. The structure also includes a forward section hinged at 223, consisting of a base frame member 224, transverse frame members 225, guard bars 226 extending from the base member 224 to the upper portion of the forward transverse member 225, and transparent cover material 227 supported by the guard bars and frame members.

By reason of its pivotal mounting, the forward cover section may be swung forwardly, to the position shown in full lines in Fig. 4 and in broken lines in Fig. 10, to permit patrons to enter or leave the boat.

In order to prevent damage to the engine casing 107, the boats may be provided, as shown in Figs. 10 and 11, with a guard plate 231 which may be secured to the curved portion 97 of the hull bottom and may depend therefrom just forwardly of the nose of casing 107.

In order to protect the rudder and propeller units of the boats, each boat may be provided with a guard, shown in Figs. 19 and 20, consisting of a metal strap 232 secured to the hull bottom 98 and extending around the propeller 118. Carried by the strap 232 are horizontally disposed loops 233, also of strip metal, extending around the rudder 177.

In Figs. 21 and 22 is shown a novel form of throttle control linkage whereby continued actuation of the steering wheel 154 of a boat will be effective to maintain the engine throttle open. Connected to the upright bell crank arm 172 is a rod 241 extending through an opening in an arm 242 that is secured to shaft 135, replacing the pedal 134 shown in Fig. 14. On the end of rod 241 is a stop 243, and between the latter and arm 242 a coil spring 244 is disposed upon rod 241.

An arm 245 is also mounted upon shaft 135, its free end being pivoted at 246 to a piston rod 247. The latter extends through gland 248 into a cylinder 249 which is pivoted by pin 251 to a stationary part of the boat. Secured to the inner end of piston rod 247 is piston 252 which fits the cylinder walls so loosely that oil, which fills the cylinder, may pass, relatively slowly, from one to the other side of the piston. Openings 253 extend through the piston and are normally closed by a disc valve 254 held by a light spring 255 disposed between the valve and an abutment 256 on the piston rod 247.

In operation of the boats, it has been found that the patron-occupants thereof actuate the steering wheels almost constantly, turning them first in one direction and then in the other. Upon each movement of the wheel raising rod 167 (which will move link 173 rearwardly, moving the rudder to cause a left turn of the boat), rod 241 will be moved rearwardly, to the left as the parts are viewed in Fig. 21, causing the spring 244 to press against arm 242, and thereby causing the arm and shaft assembly 242, 135, 245, 133 to be swung counterclockwise against the resistance of spring 137. This permits rod 114 to move forwardly by action of spring 138, opening the engine throttle valve 113 and causing the boat, unless held by a brake or gate, to proceed at full speed. The counterclockwise motion of arm 245 will depress rod 247 and piston 252, and oil beneath the piston will pass through openings 253, the valve 254 lifting to permit such passage. Movement of the steering wheel beyond the point at which the throttle is fully opened is permitted by compression of spring 244.

When the steering wheel 154 is turned in the opposite direction, lowering rod 167 and moving rod 241 forwardly, dash-pot action of the piston and cylinder 252, 249, will temporarily retain the throttle valve open. The spring 137 will tend to raise the piston and piston rod by swinging the assembly including arm 133 clockwise, this action moving rod 114 rearwardly and closing the throttle. However, this action will be slow, being limited by the slow leakage of oil past the piston, the valve 254 being closed. Therefore, in most instances, before the throttle has appreciably closed, another actuation of the wheel 154 will have again widely opened the throttle.

With this arrangement the boats require no pedal manipulation by patrons, and will usually proceed at full speed, affording maximum enjoyment and thrills to the occupants and to spectators. Furthermore, a boat may be easily handled when in the slip of the loading platform, a mere twist of the wheel 154 by the amusement apparatus operator causing the boat to propel itself forwardly, avoiding necessity of the operator operating a throttle pedal or handle.

It will be understood that in operation of the boats, the forward portions thereof may plane out of the water slightly, the boats riding on the rear surfaces of the hull bottoms 98 and tires 90. Due to the large diameter and displacement of the latter, any tendency of the boats to tip over to a dangerous angle is avoided; any dipping of one section of the tire will very greatly increase the displacement of the boat along that edge, thereby assuring a relatively high degree of stability. Because of their circular shape, and the rudder and propeller arrangement, the boats may be turned about their own vertical axes. By reason of the vertical rollers along the walls of the tank they may even turn when against the tank walls, whereas without such rollers it is difficult, if not impossible, for the boats of this form to maneuver away from such walls.

It will be understood further that the apparatus herein shown and described is merely illustrative of the inventive principles involved, and that these principles may be otherwise embodied without departing from the spirit of the invention or the scope of the appended claims.

I claim:

1. In amusement apparatus, a boat having propulsion means including a movable speed control element, a steering gear for the boat, means operable by and upon steering movement of the steering gear to urge said speed control element to high speed position, resilient means for urging said element to low speed position, and means for retarding operation of said resilient means.

2. In amusement apparatus, a boat having propulsion means including an engine with a throttle valve, a steering gear for said boat, means operable by and upon steering movement of the steering gear for opening said throttle valve, and means for slowly closing said throttle valve when said steering gear operable means is ineffective.

3. In amusement apparatus, a boat having a propeller and an engine for driving the propeller, said engine having a throttle valve for controlling the speed thereof, means including a centrifugal clutch connecting the engine and propeller, said clutch engaging when the engine operates at a predetermined speed above idling speed as a consequence of the throttle valve being opened, steering gear for the boat, means operable by and upon movement of the steering gear to open said throttle valve, and delayed action means for closing said throttle valve when the steering gear is not being moved.

4. In apparatus of the class described, a boat hull having a substantially circular bottom and a substantially cylindrical side wall, a pneumatic tire mounted upon and extending around said side wall, said tire constituting resilient bumper means and also water displacement means for supporting and stabilizing the boat, a drive housing constituting a part of said bottom and projecting below the side wall, drive means in said housing including a propeller shaft projecting from the housing in substantially diametrical relation to a circular side wall, a screw propeller mounted on said shaft and a rudder disposed rearwardly of the propeller.

5. In apparatus of the class described, a hull having a substantially circular bottom wall and a substantially cylindrical side wall extending upwardly therefrom, a pneumatic tire mounted upon and extending around said side wall, a well in said circular bottom wall depending therefrom in substantially diametrical relation thereto, and drive means including a motor in said well and a rotatable shaft for a screw propeller extending through an end wall of said well in a vertical plane in substantially diametrical relation to said cylindrical side wall.

6. In amusement apparatus, a boat comprising a substantially cylindrical body portion, a pneumatic tire surrounding and supported by said body portion and projecting below the normal water line of the boat, said tire constituting a resilient bumper and also acting normally as water displacement means for supporting the boat, said tire being rounded in vertical section to facilitate riding thereof upon or under the tire of a similar boat during a collision of said boats, walls defining a passenger compartment extending upwardly from said body portion, and propelling and steering means depending from said body portion, said walls constituting a fender engageable by the tire of a similar boat when the latter overrides the first mentioned tire during a collision of the boats, to prevent the first mentioned tire from engaging said propelling and steering means of the similar boat.

HYLA F. MAYNES.